United States Patent [19]

Knothe et al.

[11] 4,320,809

[45] Mar. 23, 1982

[54] WEIGHING MACHINE WITH EXPLOSION PROOF CASE

[75] Inventors: Erich Knothe, Bovenden; Dieter Blawert, Göttingen, both of Fed. Rep. of Germany

[73] Assignee: Sartorius GmbH, Göttingen, Fed. Rep. of Germany

[21] Appl. No.: 146,185

[22] Filed: May 2, 1980

[30] Foreign Application Priority Data

May 8, 1979 [DE] Fed. Rep. of Germany ... 7913203[U]

[51] Int. Cl.$^3$ ............................................. G01G 21/28
[52] U.S. Cl. .................................................... 177/243
[58] Field of Search ................................. 177/239–243

[56] References Cited

U.S. PATENT DOCUMENTS

| | | | |
|---|---|---|---|
| 2,661,181 | 12/1953 | Stock | 177/238 X |
| 3,166,136 | 1/1965 | Coffman | 177/238 X |
| 3,215,216 | 11/1965 | Wiedemann | 177/241 X |
| 3,444,943 | 5/1969 | Tytus | 177/243 X |

Primary Examiner—George H. Miller, Jr.
Attorney, Agent, or Firm—Eric P. Schellin

[57] ABSTRACT

A weighing machine with an explosion proof case enclosing the weighing system and having an electric or electronic indicator and a weighing scale for holding the material to be weighed, the case offering a specific resistance to a specific explosion pressure inside the case, whereby the scale may be safely used in an explosive environment without danger of causing an explosion exteriorly of the case due to electric arcing or the like caused by the scale electrical system inside the case.

14 Claims, 3 Drawing Figures

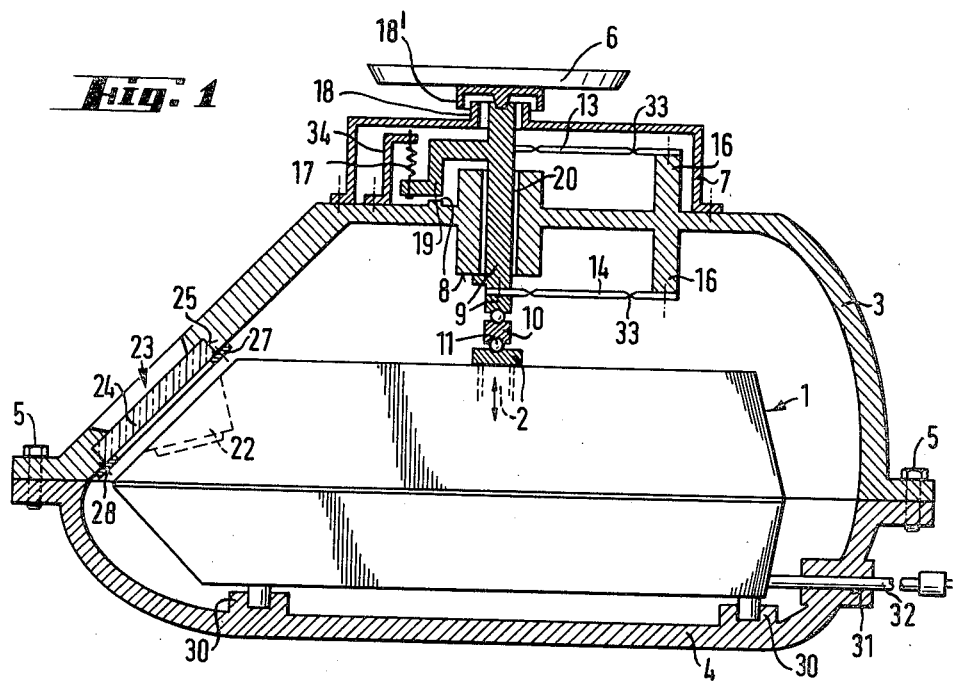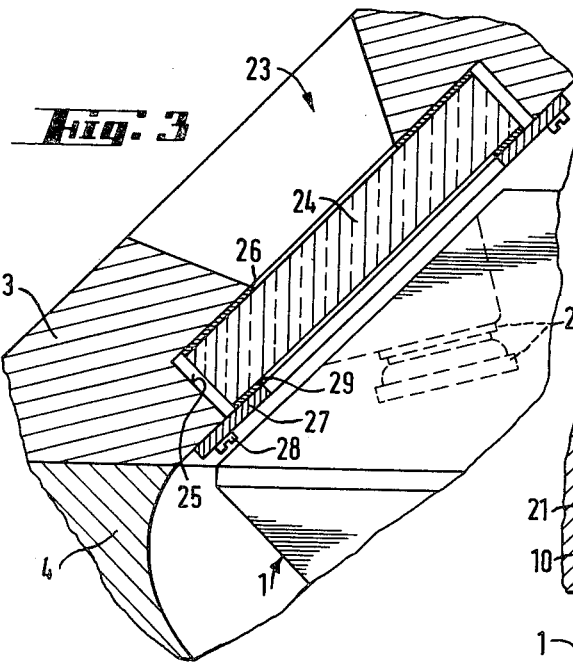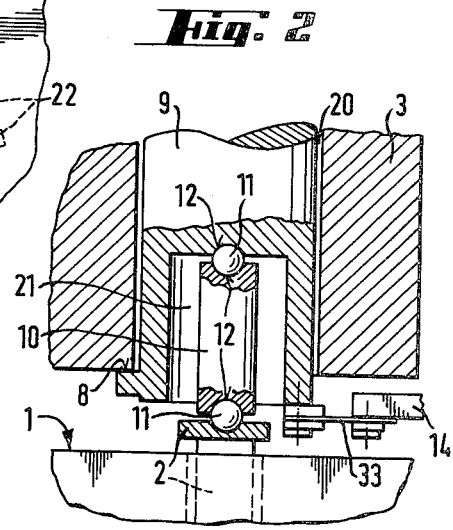

WEIGHING MACHINE WITH EXPLOSION PROOF CASE

BACKGROUND OF THE INVENTION

1. Field of the Invention

The invention relates to a weighing machine with a case enclosing the weighing system, provided with an electric or electronic indicator and a weighing scale for holding the material to be weighed, which is movable a limited amount in vertical direction and is supported on the weighting system.

2. Prior Art

Conventional electromechanical weighing machines have an ample electric and electronic system which, to be sure, permits on the one hand a fast and comfortable weighing of the material, but on the other hand threatens to form, by sparkover and shortcircuits, an explosion when the weighing machine is employed in rooms with explosive atmosphere or when explosive material is to be weighed with the weighing machine. In highly sensitive precision weighers the weighing scale for holding the material to be weighed is supported on the weighing system, which is arranged in an enclosing case. The weighing scale support in this structure penetrates the case without contact. The ring slot thus formed is sealed merely by a labyrinth packing, so that the weighing scale support can move vertically, limited by stops, but otherwise passes frictionless through the case.

This renders it impossible to seal the interior of the case, which contains the electric system in a gas-tight manner, so that inside the case the same atmosphere prevails as outside the case.

To be sure, it is principally possible to install electronic component parts in a short-circuit-proof manner, but this is too expensive, considering the ample electric and electronic system of such weighing machines. Such electronic weighing machines could until now not be employed in spaces where an explosion might occur.

Conventional and still used mechanical weighing devices likewise usually have electric component parts, e.g., an illuminating device for the indication. Thus, it is already known (German DE-OS No. 18 00 688) to provide an explosion protection for the illuminating device of a weighing machine, especially for a scale projection device. In this structure, the lamp of the illuminating device is mounted in a protective case arranged in the weigher case and connected to the lighting line via a leakage reactance transformer that reduces the voltage, the primary of said leakage reactance transformer being switched on and off by an explosion protection switch arranged in the weighing case. In this weighing machine, only an illuminating device is used as an electric component part, which in this case may also be provided at a justifiable expense with an explosion protection. As soon as the electric and electronic component parts exceed a certain extent in number and volume, such a measure, as it is proposed by the prior art, is too expensive. Furthermore, the component parts would become too voluminous, so that they could no longer be installed in a standard weighing machine case, e.g., for precision weighers, but would have to be placed beside the weigher. This would restrict the space of operation and impair the weighing comfort.

SUMMARY OF THE INVENTION

The purpose of the invention is therefore the provision of an electromechanical or electronic weigher of conventional structure with an explosion protection without impairing the weighing comfort characteristic for such weighers.

This purpose is achieved according to the invention by means of a structure, wherein a commercial weighing machine is enclosed in a pressure-proof case, which has a specific resistance to a specific explosion pressure originating at the inside, and furthermore, wherein a weighing scale is provided outside the pressure-proof case, which weighing scale is supported on a rod system, the rod system penetrating the pressure-proof case without contact in a tightly enclosing and relatively long perforation, the rod system, moreover, extending parallel in vertical direction and being supported on the weigher system; wherein, furthermore, in the area of the indicator of the pressure-proof case, a pressure-proof inspection glass of transparent material is provided; and finally, wherein the electric supply lines are inserted in the pressure-proof case in an explosion-proof manner.

Thus, the result is assured that on the one hand the high weighing comfort of such precision weighers remains fully preserved and commercial precision weighers from the series can be constructed in an explosion-proof way at a tolerable construction expense and can thus also be employed in spaces where explosions may occur. In the same manner, directly explosive material can be weighed with such a weigher. The explosive atmosphere, to be sure, is here, too, connected with the interior of the pressure-proof case and thus also with the interior of the weigher proper, but on the basis of the long path that the explosion front must cover from the inside to the outside, the ignition of the atmosphere outside the pressure-proof case is impossible. The term "specified explosion pressure" and the term "specified resistance" of the pressure-proof case have been defined by public building regulations and they amount, e.g. for the present example, to 10–15 bar., and in this structure, the case must in a first test resist to an explosion pressure of 40–50 bar.

It is particularly advantageous to provide the plunger with a separate parallel construction, which is provided partly outside and partly inside the pressure-proof case, so that also the structural height of the entire apparatus can be kept relatively low. The parts supported on the weighing system and vertically movable are held by a dead load spring adjustable outside the case in a position that does not load the weighing system.

BRIEF DESCRIPTION OF THE DRAWINGS

The concept of the invention, which permits a great variety of embodiments, is explained in greater detail with the aid of the attached drawing, wherein:

FIG. 1 is a diagrammatical longitudinal section through the explosion-proof weighing machine;

FIG. 2 is a greatly enlarged fragmentary view of a modification of what is shown in FIG. 1 relative to the plunger and adaptor construction, and FIG. 3 is a greatly enlarged view of the inspection glass.

DETAILED DESCRIPTION OF THE PREFERRED EMBODIMENTS

An assembly line electronic precision weigher 1 is mounted in an enclosing pressure-proof case 3, 4, which consists of a cover section 3 and a bottom section 4, these parts being provided with circular flanges rigidly connected by means of a multiplicity of screws 5 or other clamping means. Weigher 1 is provided, in a known manner, with a multiplicity of electronic component parts and a transformer, which elements are supplied in a short-circuit-proof and faultless manner and is inserted through the cable passage 31 into pressure-proof case 3, 4. The weighing system of weigher 1 may operate, e.g., according to the principle of electromagnetic force compensation and ends with its load-supporting device 2 on the top side of weigher 1, and normally supports a load scale. In the present embodiment, the invention is presented in the form of an upper-scale weigher. In this case, the parallel construction described below is arranged in the bottom part 4 of pressure-proof case 3, 4. The rod system, formed by adaptor 10 and plunger 9, for the weighing scale proper is supported on weighing system 2 via balls 11 and ball sockets 12.

Plunger 9 penetrates without contact cover section 3 of the pressure-proof case, a ring slot of about 25 mm length and 0.1 mm width being formed between case section 3 and plunger 9. In order to be able to pass the plunger 9 in the ring slot 20 concentrically in vertical direction, plunger 9 is passed parallel with the aid of an upper guide 13 and a lower guide 14, in which structure upper guide 13 and lower guide 14 are provided, in a known manner, with joints 33, in the area of attachment to plunger 9 and in the area of attachment to the fixed points 16 of the cover section 3. The possible vertical movement of load scale 6 and plunger 9 is limited by stops 8 and amounts to a few tenths of a millimeter. Upper guide 13 is covered by a protective hood 7, which in the area of plunger 9 ends in a collar 18 and forms, together with another collar 18 of plunger 9, a labyrinth seal by means of which the intrusion of foreign matter into the weighing system is prevented.

Plunger 9 is, furthermore, provided with a bracket 19 to which a dead load spring 17 is connected at one end and which on the other end is fastened to a bracket 34 of case cover 3 and by means of which from the outside the vertically movable parts, such as plunger 9, parallel construction 13, 14 and weighing scale 6 are held in a position, which does not load weighing system 2. The adjustment can take place at any time by the adjusting means provided outside the pressure-proof case 3, 4 without an additional adjustment of weigher 1 positioned in the pressure-proof case 3, 4.

In the area of the indicator 22 of weigher 1 an inspection glass 23 is provided in cover section 3, which inspection glass is likewise constructed, with the aid of a non-clouding windscreen 24 made from bulletproof glass, in a pressure-proof manner. Bulletproof glass 24 is, in this structure, positioned in a circular recess 25 provided with a sealing frame 26 of lead. Bulletproof glass 24 is clamped in the recess 25 by means of screws 28 and clamping frame 27, and a sash frame 29 of lead is provided as a seal and lining between glass 24 and clamping frame 29.

FIG. 2 shows a modification of the connection of plunger 9, adaptor 10, and weighing system 2. In this modification, adaptor 10 is positioned in a blind hole 21 open toward the weighing system 2, and likewise flexibly coupled, via balls 11 and ball sockets 12 with plunger 9 and weighing system 2. As in FIG. 1, weigher 1 is immovably fixed in bottom section 4 by means of supports 30, so that the pressure-proof case, 3, 4 with the weigher 1 positioned inside, can also unhesitatingly be transported without the danger that weigher 1 slides back and forth within pressure-proof case 3, 4. Since, however, fixation is possible only within a certain tolerance, a connection resisting bending between plunger 9 and weighing system 2 would result in damage thereto or to parallel construction 13, 14. Due to the flexible positioning and insertion of adaptor 10 by means of balls and ball sockets, the adaptor is capable of pivoting slightly, transversely to its vertical axis, about the prevailing ball point of rotation without damaging effects upon weighing system 2. Blind hole 21 is accordingly kept at a somewhat larger diameter than the diameter of adaptor 10. In the embodiment of FIG. 2, adaptor 10 may likewise slightly move laterally.

The total structural height of pressure-proof case 3, 4 can be reduced by the arrangement of upper guide 13 outside cover section 3 and by including, according to FIG. 2, adaptor 10 in a blind hole 21 of plunger 9.

As shown in FIG. 1, there is, on the basis of the contactless penetration of plunger 9 through protective hood 7 and through cover section 3, an atmospheric connection between the interior and exterior of the case. If, in fact, a heating of the electric parts in weigher 1 up to a critical ignition temperature takes place, or if a sparkover or shortcircuit occurs between the electric parts, the explosive atmosphere in pressure-proof case 3, 4 may explode, which may result in a destruction of the weigher 1 but not have the effect that the explosion front penetrates to the outside and thus ignites the remaining explosive atmosphere. By the relatively narrow and long ring slot 20 the explosion gases, before they pass to the outside, are cooled off to such an extent, that their temperature is below the explosion temperature.

Preferably, the inner profile of pressure-proof case 3, 4 is adapted to that of a hollow sphere or an oblong trough, so as to ensure a favorable pressure distribution. In the remaining interspace above or below weigher 1 and the two case cups 3 and 4, additional electronic devices, e.g., coupling devices, may be placed in an explosion-proof manner.

Weighing machines for greater loads are usually constructed as so-called weighbridges. In this case, a rectangular load scale is supported on the four joints on a bridge of the weighing system. The parallel construction shown in FIGS. 1 and 2 may also be employed for such weighbridges. Adaptor 10 can in this structure either be transformed into a distribution cross resistant to bending, whose ends are supported on the bridge of the weighing system, or each joint of the bridge is loaded by a separate plunger with parallel construction, which analogously to FIG. 1, is passed through case 3, 4. The outside load scale is adapted to the load scale of the weighbridge and is supported, either via a distribution cross on the central plunger or on the four joints on the four plungers with parallel construction.

What we claim as new and desire to secure by United States Letters Patent is:

1. A weighing machine with a case enclosing the weighing system, provided with an electric or electronic indicator and a weighing scale for holding the material to be weighed, said scale being movable a limited distance in vertical direction and supported by the weighing system, characterized in that, the case enclosing the weighing machine is pressure-proof and offers a specific resistance to a specific explosion pressure issuing from the interior of the case;

the weighing scale is provided outside the pressure-proof case and is supported on a rod system, which penetrates the pressure-proof case in a tightly enclosing and relatively long perforation without contact;

the rod system extending parallel in vertical direction and being supported on the weighing system;

that in the area of the indicator of the pressure-proof case, a pressure-proof inspection glass of transparent material is provided;

and that electric supply and data lines are installed in the pressure-proof case in an explosion-proof manner.

2. A weighing machine as in claim 1, characterized in that, the rod system is the coupling element of a parallel construction consisting of an upper guide and a lower guide.

3. A weighing machine as in claim 1 or 2, characterized in that the parallel construction for the rod system is included in the interior of the pressure-proof case.

4. A weighing machine as in claim 1 or 2, characterized in that, the pressure-proof case consists of two half shells, which are connected by detachable connecting means.

5. A weighing machine as in claim 1 or 2, characterized in that, the rod system consists of a plunger and an adaptor, which connects the plunger with the weighing system, and that the adaptor is supported flexibly on both sides and is positioned so as to be limitedly pivotable transversely to its vertical axis on the plunger.

6. A weighing machine as in claim 3, characterized in that, the pressure-proof case consists of two half shells, which are connected by detachable connecting means.

7. A weighing machine as in claim 4, characterized in that, the two half shells consists of a bottom section and a cover section.

8. A weighing machine as in claim 4, characterized in that, the two half shells are shaped as trough-like, rounded shell molds.

9. A weighing machine as in claim 5, characterized in that, the adaptor is at its ends ball-shaped, and the outer supports, which receive the ends, are pan-shaped on the plunger and on the weighing system.

10. A weighing machine as in claim 9, characterized in that, the adaptor is positioned in a blind hole of the plunger, open in the direction of the weighing system and that the blind hole is of a diameter larger than the diameter of the adaptor.

11. A weighing machine as in claim 2, characterized in that, the upper guide of the parallel construction for the plunger is arranged outside, and the lower guide inside the pressure-proof case, and that these guides are connected on one side with the plunger, which acts as coupling element, and on the other side with fixed points of the pressure-proof case in a flexible manner.

12. A weighing machine as in claims 1 or 2 or 11 characterized in that, the transparent material of the inspection glass is supported in a circular recess of the pressure-proof case, and a circular sealing frame of lead is provided between the transparent material and the recess.

13. A weighing machine as in claims 1 or 2 or 11, characterized in that, the parts supported on the weighing system and which are vertically movable, such as plunger, addaptor, parallel construction and outer weighing scale, are held by a dead load spring adjustable from outside the pressure-proof case in a position, that does not load the weighing system.

14. A weighing machine as in claim 12, characterized in that, the perforation in the pressure-proof case equals or exceeds a length of 25 mm, and the guide slot between the perforation and the rod system equals or is smaller than 0.1 mm.

* * * * *